United States Patent Office 3,322,344
Patented May 30, 1967

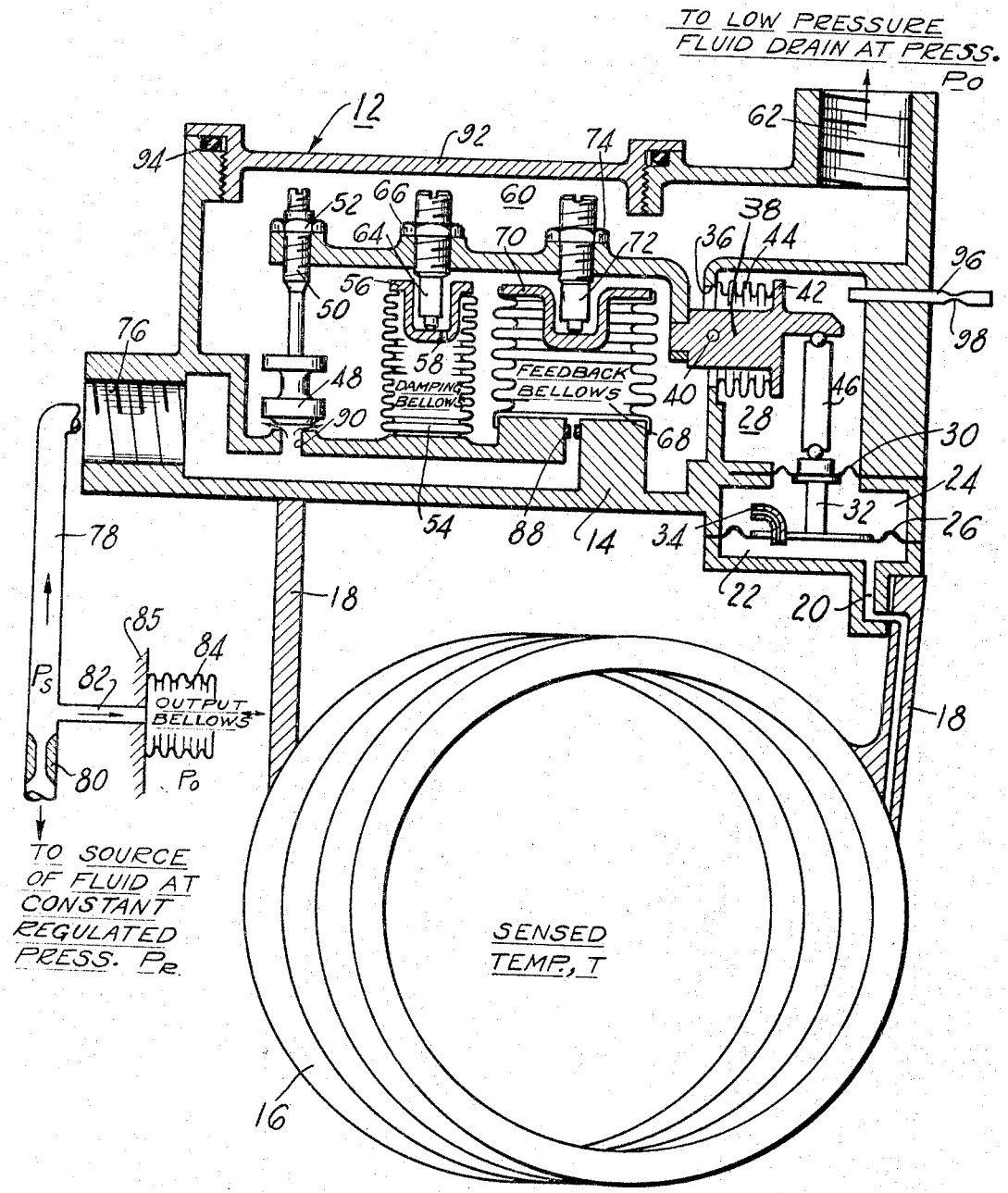

3,322,344
TEMPERATURE SENSOR HAVING RATE OF CHANGE OF TEMPERATURE SENSING MEANS
Joseph L. Peczkowski and David C. Thoman, South Bend, Ind., assignors to The Bendix Corporation, South Bend, Ind., a corporation of Delaware
Filed Mar. 17, 1965, Ser. No. 440,477
3 Claims. (Cl. 236—86)

This invention relates, in general, to temperature responsive control apparatus and, in particular, to control apparatus wherein an input fluid pressure signal which varies as a function of a temperature sensed by a temperature responsive medium is converted to an output fluid pressure signal or equivalent position signal of greater relative magnitude than the input fluid pressure signal for control purposes.

A significant disadvantage of existing temperature responsive control apparatus of the above mentioned type wherein, for example, a liquid or gas filled probe responsive to a variable temperature acts through an associated fluid servo to provide an amplified output signal lies in the response characteristics of the control apparatus. In certain applications, as, for example, fuel control mechanism for gas turbine engines, the time delay or lag between a change in the sensed temperature and the resulting output signal derived from the control apparatus is too great to provide adequate control over the rate of fuel flow to the engine and thus engine temperatures and/or pressures generated thereby as a result of the combustion process. For reasons of engine efficiency such gas turbine engines may be operated close to the maximum temperature which the engine can tolerate for any significant length of time without failure of the engine components exposed to such temperature. In such cases, it will be recognized that the response characteristics of the temperature responsive control apparatus should be as fast as possible.

It is therefore an object of the present invention to provide control apparatus having a variable input signal and an output signal which varies as a function of the rate of change of the input signal with an exceedingly fast response.

It is another object of the present invention to provide temperature responsive control apparatus wherein an output signal varies as a function of the rate of change of an input temperature signal with a fast rate of response.

It is still another object of the present invention to provide temperature response control apparatus which is relatively simple in structure, reliable in operation, and readily responsive at a fast rate to changes in the sensed temperature.

An important object of the present invention is to provide control apparatus for use in an environment where noise and/or vibration occurs and which is responsive to a variable input signal which is unaffected by environmental noise and/or vibration.

Other objects and advantages of the present invention will be apparent from the following description and accompanying drawing.

Referring now to the drawing, the present invention is generally indicated by numeral 12 and includes a casing 14. A coiled tube 16 having a constant internal volume is pressurized with helium or other suitable gas which, in accordance with Charles' gas law, will generate a gas pressure, $P_1$, directly proportional to the absolute temperature, T, to which the coiled tube 16 is exposed. The tube 16 is provided with support brackets 18 which attach to casing 14 by any suitable fastening means, not shown. The interior of tube 16 is vented via passage 20 to a chamber 22 which is separated from another chamber 24 by a flexible diaphragm 26 which diaphragm preferably is made from a material such as sheet metal capable of withstanding relatively high temperatures and/or gas pressures for extended periods without adverse effects on the flexibility and fluid seal properties thereof.

The chamber 24 is separated from a chamber 28 by a flexible metal diaphragm 30 similar to diaphragm 26 but considerably smaller in area exposed to chamber 24, the area ratio thereof being on the order of 5 or 10 or possibly more. The diaphragm 30, like diaphragm 26, is fixedly secured at its radial outer edge portion to casing 14 by any suitable fastening means, not shown. The diaphragms 30 and 26 are fixedly secured together in spaced relationship by a link or rod 32 which is secured to the diaphragms by any suitable and conventional connecting medium, not shown.

A capillary tube 34 fixedly secured to diaphragm 26 by any suitable means, not shown, provides a restricted passage for gas flow between chambers 22 and 24 which, as will be explained later, establishes a pressure differential across diaphragm 26 to thereby provide a force which is proportional to the rate of change of temperature sensed by tube 16.

The chamber 28 is provided with an opening 36 in the wall thereof through which a lever 38 extends. The lever 38 is supported on a pivot member 40 secured to casing 14 and includes an integral flanged portion 42 which is fixedly secured to one end of a bellows 44 by any suitable means such as brazing to provide a fluid tight seal. The opposite end of bellows 44 is fixedly secured to casing 14 at the perimeter of opening 36 by any suitable means such as brazing to provide a fluid tight seal.

The force derived from diaphragms 26 and 30 is applied to one end of lever 38 through a rigid connecting member 46 interposed between the one end of link 32 and the end of lever 38. The lever 38 is adapted to actuate a servo valve 48 which is adjustably secured to the opposite end of lever 38 by means of a threaded stem 50 threadedly engaged with lever 38 and locked in position relative thereto by a nut 52.

A damping bellows 54 is fixedly secured at one end to casing 14 by any suitable means such as brazing to provide a fluid tight seal. A cap 56 secured to the opposite movable end of bellows 54 by means such as brazing to provide a fluid tight seal is provided with a restricted passage 58 which vents the interior of bellows 54 to the surrounding chamber 60 which chamber communicates with a drain source at relatively low pressure $P_0$ via port 62. An adjustable follower member 64 threadedly engaged with lever 38 extends into engagement with cap 56 and is locked in position by nut 66.

A feedback bellows 68 is fixedly secured at one end to casing 14 by any suitable means such as brazing to provide a fluid tight seal. A cap 70 is secured to the opposite movable end of bellows 68 by means such as brazing to provide a fluid tight seal. An adjustable follower member 72 threadedly engaged with lever 38 extends into engagement with cap 70 and is locked in position by nut 74.

A port 76 in casing 14 is connected via passage 78 to a source of fluid which is maintained at a regulated constant pressure $P_R$. A restriction 80 is secured in passage 78 upstream from a branch passage 82 which connects passage 78 with the interior of a bellows 84. The one end of bellows 84 is fixedly secured to fixed support means 85 and the opposite movable end provides an output force or position signal in response to the fluid pressure, $P_s$, therein. The bellows 84, like bellows 54 and 68, is exposed externally to drain pressure $P_0$ which acts as a system reference pressure. The passage 78 communicates with the interior of bellows 68 via port 76 and a passage 86 leading from port 76 to bellows 68. A damping restriction 88 is secured in passage 86. The fluid pressure $P_s$ to which bellows 68 and 84 responds is controlled by servo valve 48 which controls the flow area of a vent passage 90 connected between passage 86 and chamber 60 at relatively low drain pressure $P_0$.

Access to chamber 60 and the various adjustable members 50, 64 and 72 contained therein is provided by an opening in casing 14 which is closed by a cap 92 threadedly engaged with casing 14. An O ring 94 suitably secured between casing 14 and cap 92 provides a fluid seal.

The input signals derived from diaphragms 26 and 30 may be made independent of temperature variations of the fluid at pressure $P_0$ circulating within casing 14. If chamber 28 contained fuel at pressure $P_0$, it is apparent that temperature variations of the fuel would cause a corresponding variation in the pressure differential across diaphragm 30 assuming a given pressure in chamber 24. To avoid such an effect, the chamber 28 may be filled with a suitable gas such as helium and evacuated to a pressure of approximately 20–50μ Hg absolute. Evacuation may be accomplished by means of a tube 96 suitably secured to casing 14 in air tight engagement and extending from chamber 28 outwardly through casing 14. A suitable vacuum source, not shown, removably connected to tube 96 can evacuate the chamber 28 to the desired pressure whereupon the tube 96 is crimped closed as shown by 98 to seal the same thereby maintaining the pressure level within chamber 28.

*Operation*

For explanation purposes, it will be assumed that the subject temperature sensing control apparatus is a component of a fuel control system for a gas turbine engine such as the system disclosed in U.S. Patent No. 3,103,785, issued Sept. 17, 1963 to H. J. Williams et al. and having a common assignee. In such a case, the source of fluid at regulated constant pressure, $P_R$, can be considered fuel tapped from a suitable high pressure fuel source and reduced in pressure by conventional fluid pressure regulating mechanism. The chamber 60 can be vented to a low pressure fuel source such as a fuel pump inlet or the like. The output bellows 84 can be connected to provide a force or position signal to thereby effect control over fuel flow to the engine as a function of a sensed condition such as compressor inlet air temperature.

Under the abovementioned conditions, the coiled tube 16 is exposed to the air entering the compressor inlet and assumes the temperature of the same. Initially, it will be assumed that the control mechanism occupies a stable position in response to a given temperature of the compressor inlet air.

An increase in compressor inlet air temperature from said given value results in a corresponding temperature increase of coiled tube 16 and the gas therein. The resulting expansion of the gas in the fixed internal volume of tube 16 produces a rise in gas pressure in chamber 22 thereby creating a pressure drop across diaphragm 26 and subsequent gas flow through the capillary tube 34. A force equal to the pressure drop multiplied by the area of diaphragm 26 plus the pressure differential between chambers 24 and 28 multiplied by the area of diaphragm 30 is generated and applied to the lever 38 which pivots counterclockwise about support 40. The servo valve 48 being attached to lever 38 moves in a closing direction causing a rise in pressure $P_s$ to feedback bellows 68 and output bellows 84. The force derived from feedback bellows 68 acts through lever 38 in opposition to the input force derived from diaphragms 26 and 30 thereby tending to balance lever 38 in the usual manner of such feedback circuitry. The input force is also partially balanced by the action of the damping bellows 54 which, by virtue of the restricted passage 58 tending to restrict flow into or out of the bellows 54, provides a temporary damping force opposing the counterclockwise movement of lever 38.

The flow through the capillary tube 34 from chamber 22 to chamber 24 results in equalization of the pressures therein and subsequent loss of the pressure drop across diaphragm 26 which, in turn, eliminates the force derived from diaphragm 26. The diaphragm 30 being responsive to the pressure in chamber 24 provides the input force to the lever 38 which is stabilized in position accordingly assuming the sensed temperature at tube 16 is stabilized. Thus the fuel pressure $P_s$ to output bellows 84 becomes a transduced signal pressure as a function of the temperature sensed by tube 16. With the casing 92 secured in position to the engine, that portion of the casing defining a substantial portion of chamber 24 is adapted to protrude into the air at temperature T such that the gas in chamber 24 and probe 16 is maintained at the same temperature. Thus, pressure variations in chamber 24 resulting from a temperature different from that of the sensed temperature, T, are avoided thereby promoting accuracy.

In the event of a decrease in temperature sensed by coiled tube 16, the reverse of the above described operation will occur. The gas pressure in chamber 22 will decrease causing a pressure drop across diaphragm 26 with the force resulting therefrom acting in opposition to the force derived from the pressure in chamber 24 acting on diaphragm 30. The flow through capillary tube 34 from chamber 24 to chamber 22 results in equalization of the pressures therein and elimination of the force derived from diaphragm 26 in the manner heretofore mentioned. The input force applied to lever 38 is then dependent only upon the pressure in chamber 24 acting against the diaphragm 30.

It will be understood that the capillary tube 34 provides laminar flow characteristic for the passage of gas between chambers 22 and 24 which results in flow therebetween being directly proportional to the pressure drop across the capillary tube 34. The linear relationship between flow and pressure drop of the capillary tube 34 permits the time constant, $\tau$, of the chamber 24 at any temperature, $T_1$, to be expressed by the relationship $$\tau = \frac{128\mu L V_2}{\pi P_1 D^4}$$

where $\mu$ represents absolute viscosity of helium in $$\frac{\text{lb./sec.}}{\text{in.}^2}$$

at temperature $T_1$, $P_1$ represents absolute pressure of helium at $T_1$, D represents internal diameter of tube 34 in inches, L represents length of tube 34 in inches and $V_2$ represents volume of chamber 24 in cubic inches. Thus, with $D = .004$ inch, $L = 2.5$ inches and $V_2 = .1$ in.$^3$, $P_1 = 170$ p.s.i.a. and $$\mu = 2.7 \times 10^{-9} \frac{\text{lb./sec.}}{\text{in.}^2}$$

$\tau$ is calculated to be .6 second such that the system behaves dynamically like a first order system with a .6 sec. lag. It is to be noted that the abovementioned .6 sec. lag represents a possible improvement by a factor of 5 in response time over that of the same temperature sensing control apparatus without the function provided by the diaphragm 26 and capillary tube 34.

The various adjustable portions 50, 64 and 72 of servo valve 48, damping bellows 54 and feedback bellows 68, respectively, provide for calibration of the system to obtain the desired response of valve 48 to the input force applied to lever 38.

Since the interior of tube 16, chamber 22 and chamber 24 represent a sealed volume, the opportunity for contamination from dirt or the like is minimized. Also, the pressure signals to which the diaphragms 26 and 30 are responsive are derived from a gas which is substantially insensitive to environmental vibrations and/or noise which, in many systems of this general type, cause extraneous pressure pulse signals which are imposed upon the input pressure responsive members giving a false indication of the sensed temperature.

It will be apparent that various changes and modifications may be made in the present invention as shown and described above without departing from the scope of the invention defined by the following claims.

We claim:

1. Temperature responsive control apparatus comprising:

temperature probe means having an internal volume filled with a pressurized gas and being exposed to a variable temperature condition to be sensed whereby the pressure of the gas varies as a function of the sensed temperature;

a first chamber vented to the interior of said probe means;

a second chamber;

an evacuated gas filled third chamber;

a capillary passage connecting said first and second chambers;

a first fluid pressure responsive member separating said first and second chambers and responsive to a fluid pressure differential generated therebetween as a result of the flow restricting effect of said capillary passage;

a second fluid pressure responsive member separating said third and said second chambers and responsive to the fluid pressures therein;

means operatively connected to said first and second pressure responsive means for producing a useable output control signal in response to the forces derived from said fluid pressures acting upon said first and second pressure responsive members;

said first fluid pressure responsive member being responsive to the fluid pressure differential created across said capillary tube in response to a change in gas pressure in said first chamber resulting from a change in the sensed temperature;

said fluid pressure differential varying in magnitude at a rate proportional to the rate of change of the sensed temperature thereby providing a corresponding temporary lead force;

said gas filled third chamber defining a substantially constant pressure source under varying envirnomental temperature conditions of said third chamber to thereby render the fluid pressure differential across said second fluid pressure responsive means variable only as a function of the gas pressure in said second chamber.

2. Temperature responsive control apparatus as claimed in claim 1 wherein said capillary passage is a tubular member secured to said first fluid pressure responsive member and movable therewith.

3. Temperature responsive control apparatus as claimed in claim 1 wherein said first and second fluid pressure responsive members are flexible metal diaphragms.

References Cited

UNITED STATES PATENTS

| | | | |
|---|---|---|---|
| 1,373,634 | 4/1921 | Powers | 236—12 |
| 1,919,129 | 7/1933 | Reichel | 236—99 |
| 2,005,773 | 6/1935 | De Florez | 236—1 |
| 2,170,418 | 8/1939 | Mabey | 236—86 |
| 2,431,297 | 11/1947 | Moore | 137—85 |
| 2,907,338 | 10/1959 | Watrous | 137—85 |
| 3,036,778 | 5/1962 | Dillman | 236—80 |

WILLIAM J. WYE, *Primary Examiner.*

ALDEN D. STEWART, *Examiner.*